US010452676B2

(12) United States Patent
Chen et al.

(10) Patent No.: US 10,452,676 B2
(45) Date of Patent: Oct. 22, 2019

(54) MANAGING DATABASE WITH COUNTING BLOOM FILTERS

(71) Applicant: Hewlett Packard Enterprise Development LP, Houston, TX (US)

(72) Inventors: QiFan Chen, Austin, TX (US); Ramakumar Kosuru, Austin, TX (US); Choudur Lakshminarayan, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 244 days.

(21) Appl. No.: 15/115,006

(22) PCT Filed: Jan. 31, 2014

(86) PCT No.: PCT/US2014/014329
§ 371 (c)(1),
(2) Date: Jul. 28, 2016

(87) PCT Pub. No.: WO2015/116221
PCT Pub. Date: Aug. 6, 2015

(65) Prior Publication Data
US 2016/0342667 A1 Nov. 24, 2016

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/2255* (2019.01); *G06F 16/2462* (2019.01); *G06F 16/9535* (2019.01)

(58) Field of Classification Search
CPC .................................................... G06F 16/258
See application file for complete search history.

(56) References Cited

U.S. PATENT DOCUMENTS 6,263,345 B1    7/2001  Farrar et al.
6,477,523 B1   11/2002  Chiang
(Continued)

OTHER PUBLICATIONS

Linari, Alessandro et al., "Efficient Peer-to-Peer Semantic OverlayNetworks Based on Statistical Language Models", In: Proceedings of the international workshop on Information retrieval in peer-to-peer networks, P2PIR'06, pp. 9-16, Nov. 11, 2006.
(Continued)

*Primary Examiner* — Apu M Mofiz
*Assistant Examiner* — Farhad Agharahimi

(57) ABSTRACT

A method of managing a database including creating an initial counting bloom filter (CBF) instance having an array of counters and hash functions that map an inserted value to the array of counters, and designating the initial CBF instance as a current CBF instance, and sequentially inserting each value of a sample data set of a table column into the hash functions of the current CBF instance and incrementing counters of the array of counters to which the value is mapped. The method further includes, prior to inserting each value into the hash functions of the current CBF instance, when a number of counters of the array of counters having non-zero values is at least at a threshold level, designating the current CBF instance as an old CBF instance, creating a new CBF instance having an array of counters and hash functions that map an inserted value to the array counters, and designating the new CBF instance as the current CBF instance.

15 Claims, 8 Drawing Sheets

(51) Int. Cl.
*G06F 16/22* (2019.01)
*G06F 16/2458* (2019.01)
*G06F 16/9535* (2019.01)

(56) References Cited

U.S. PATENT DOCUMENTS

| | | | | |
|---|---|---|---|---|
| 6,789,156 | B1* | 9/2004 | Waldspurger | G06F 12/1018 |
| | | | | 711/6 |
| 7,738,717 | B1* | 6/2010 | Palmer | H03M 7/30 |
| | | | | 382/245 |
| 8,392,406 | B1 | 3/2013 | Emekci et al. | |
| 8,789,176 | B1* | 7/2014 | Brandwine | H04L 63/02 |
| | | | | 713/182 |
| 2006/0074875 | A1* | 4/2006 | Faunce | G06F 16/2462 |
| 2008/0313132 | A1* | 12/2008 | Hao | H04L 45/00 |
| 2011/0069632 | A1 | 3/2011 | Chen et al. | |
| 2012/0084287 | A1* | 4/2012 | Lakshminarayan | |
| | | | | G06F 16/2462 |
| | | | | 707/737 |
| 2013/0166557 | A1* | 6/2013 | Fricke | G06F 16/284 |
| | | | | 707/737 |
| 2013/0226972 | A1* | 8/2013 | Kosuru | G06F 16/283 |
| | | | | 707/802 |

OTHER PUBLICATIONS

International Searching Authority, "Notification of Transmittal of the International Search Report and the Written Opinion", PCT/US2014/014329, dated Oct. 15, 2014, 13 pages.

Melsted, P. et al., Efficient counting of k-mers in DNA sequences using a bloom filter, (Web Page), Aug. 10, 2011, 6 Pages.

Saborit, J. Aguilar et al., "Dynamic Count Filters", ACM SIGMOD Record, vol. 35, No. 1, pp. 26-32, Mar. 2006.

Iakshminarayan et al., "Distinct Value Estimation in SQL/MX," Internal Presentation, 2006.

Wang et al., "Bloom Histogram: Path Selectivity Estimation for XML Data with Updates", Proceedings of the 30th VLDB Conference, Toronto, Canada, 2004, 12 pages.

Zeller et al., "Updating Database Histogram Statistics Incrementally", submitted to HP TechCon 2013, May 2013.

* cited by examiner

TABLE A

| DATA SET | DIRECT SAMPLE METHOD | SAMPLE TABLE METHOD | EXAMPLE PRESENT METHOD |
|---|---|---|---|
| SET 1 (7 COLUMNS) | 3.16 SEC. | 17.81 SEC. | 2.8 SEC. |
| SET 2 (10 COLUMNS) | 5.29 SEC. | 27.03 SEC. | 6.0 SEC. |

TABLE B

| DATA SET | DIRECT SAMPLE METHOD | EXAMPLE OF PRESENT METHOD | PERCENT REDUCTION |
|---|---|---|---|
| SET 1 (7 COLUMNS) | 32,734,484 BYTES | 3,827,396 BYTES | 88.3% |
| SET 2 (10 COLUMNS) | 53,175,252 | 39,649,239 | 35.4% |

MANAGING DATABASE WITH COUNTING BLOOM FILTERS

BACKGROUND

Relational database systems store tables of data arranged in rows and columns, and which are typically linked by relationships that simplify data storage and make queries of the stored data more efficient. Structured query language (SQL) is a standardized language for creating and operating on relational databases. When receiving a query, such as from a system external to the database system (e.g. a web browser), a database system typically employs a query optimizer to construct a query plan that provides the most efficient way to execute the query (i.e. an optimal query plan).

To produce an optimal query plan, the query optimizer uses statistics associated with the involved data (e.g. a column of data), such as the number of unique values and cardinality estimates, for example. Cardinality estimates, in-turn, rely on histogram statistics of the involved table columns. In Enterprise Data Warehouse environments, content of the tables changes frequently. As a result, it is also necessary to frequently update database statistics so that the statistics accurately reflect the content changes and enable the query optimizer to continue providing optimal query plans.

BRIEF DESCRIPTION OF THE DRAWINGS

FIG. 10 illustrates tables showing relative database management performance according to the present disclosure.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
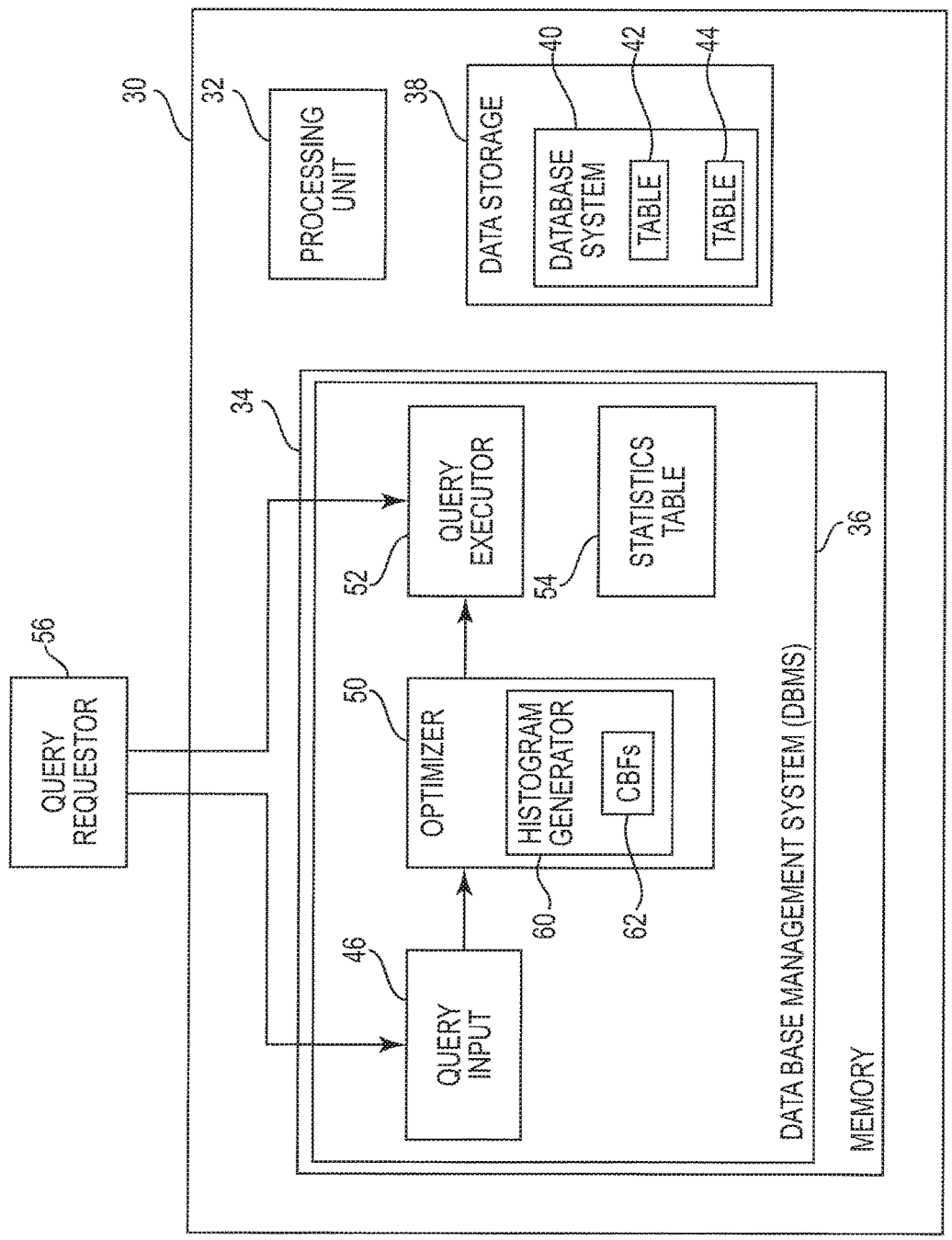
FIG. 1 is a schematic block diagram illustrating an example of a system for managing a database.

FIG. 1 is a schematic block diagram illustrating an example of a system 30 for managing a database in which Counting Bloom Filters (CBFs) for providing histogram statistics in fast and memory-efficient fashion, according to embodiments of the present disclosure, can be implemented. System 30 includes a processing unit 32, and a memory 34. Processing unit 32 can include at least one processing core. Memory 34 can be used to store data and machine executable instructions, and can be implemented as a computer readable medium, such, for example, random access memory, non-volatile memory, etc. Memory 34 can include a database management system (DBMS) 36 that accesses a database 40 stored in data storage 38. Data storage 38 can be implemented as a computer readable medium such as, for example, a hard disk system, a solid state drive system, random RAM (volatile or non-volatile), etc. Database 40, in one example, can be implemented as a relational database including tables, such as tables 42, 44, having data arranged in rows and columns which can be queried using SQL.

DBMS 36, according to the illustrated example, includes a query input 46 (e.g. a queue), a query optimizer 50, a query executor 52, and a statistics table 54. In one example, query input 52 can receive a query from a query requestor 56. Query requestor 56 can be, for example, a system external to DBMS 36 or to both DBMS 36 and system 2, such as an application executing on another computer. For example, query requestor 56 could be implemented as a web browser. In one example, the received query can be implemented as SQL relational logic (e.g. includes relational operators and/or predicates and literals).

According to one example, query input 46 provides the received query to query optimizer 50 to generate a query plan. To generate an optimal query plant, query optimizer 50 employs heuristics and logics, and relies on statistics for a given attribute, such as a number of unique values and, particularly, cardinality estimates. Cardinality estimates, in-turn, rely on histogram statistics of involved data, such as a column of data from one of tables of database 40. Such database statistics are maintained and accessed by optimizer 50, such as in statistics table 54. In Enterprise Data Warehouse environments, contents of the tables of database 40, such as tables 42 and 44, are frequently updated. To reflect the content changes, the statistics for the tables, including histogram statistics, must also be frequently updated.

A histogram for a column of data, such as a column of data from one of the tables 42, 44, typically splits the values in the column in distinct ranges, with each distinct range having approximately the same number of rows (an equal-height histogram). For each distinct range, the number of unique values, the so-called unique entry count (UEC), the row count (the total number of rows), a list of skew values, and other parameters are maintained.

Histogram statistics for a set of columns are determined by randomly sampling rows from the table, sorting each column in these rows, and building the histogram intervals. Presently, updating the statistics for a table is performed using two approaches, depending on the size of the sample set. If the sample is small enough, the entire sample is read into the memory and the data is sorted for each column. This is sometimes referred to as the "direct sample" method. If the sample is too large to be read into the memory, or too many columns are demanding histograms, the so-called "sample table" approach is employed, where the sampled rows are saved in a sample table. The sample table is then batch-processed one column, or one subset of columns, at a time. However, such an approach takes minutes, or even hours, to complete.

The large amount of time required to update the histogram statistics for the larger sample sets leads to a scalability problem as the amount of data in the EDW tables grows. A significant amount of time during the Extract-Transform-Load (ETL) phase of the EDW is spent building histograms. In some instances, the updating of the histogram statistics may not be completed in a given ETL window, resulting in the EDW operating with stale statistics. If the sampling rate is reduced so that the faster "direct sample" method can be employed, the statistics will be less accurate. Either way, the quality of the query plan provided by optimizer 50 suffers.

According to one example, optimizer 50 includes a histogram generator 60 which, in accordance with the present disclosure, employs a series of Counting Bloom Filters (CBFs) 62 to identify the unique values and the frequencies thereof in a table column, and applies an optimized sort to select boundary values for and to construct an equal-height histogram. Histogram generator 60, in accordance with the present disclosure, constructs an equal-height histogram in times which are comparable to the "direct" sample approach while using substantially less memory space.

As described above, histogram generator 60 employs a series of CBFs, or CBF instances 62, to identify unique values and their occurrence frequencies in a table column. As will be described in greater detail below, according to one example, each CBF instance includes a sequential array of bins, each bin including a multi-bit (e.g. a 3-bit counter, a 4-bit counter, etc.), a list data structure, and an overflow table, and is configured by a set of parameters. In one example, the set of parameters includes a number of hash functions (k), an estimate of a number of unique values in the sample data set from the column of the table (n), an average frequency of occurrences of a value before it is moved to an overflow table (a), and a false positive probability (p). It is noted that each CBF instance may be uniquely defined and may include a different set of parameters, different number of hash functions and different hash functions, and bin arrays having differing numbers of bins, for example.

The parameter n is the number of distinct values in the sample data set. However, in one example, parameter n may be estimated by using an enumerated estimate of the distinct values from the pilot sample. In some instances, the parameter n may be estimated over multiple samples. According to some embodiment, the estimation of n may be carried out by using an estimation tool such as Jackknife, Schlosser or a hybrid combination thereof.

The parameter, n (i.e., an estimate of the number of unique values in a sampled data set, such as in the table column), is used by histogram generator 60 to determine the number of bins, m, in the sequential array of bins. If the number of bins is set too small, the CBF will under-identify the number of unique values in a table column (i.e. false positives will be high). If the number of bins is set too large, even though the probability of false positives produced by the CBF will be reduced, the sequential array of bins will be sparsely populated and memory space will have been wasted.

When operating to provide histogram statistics for a column of data, such as a column of data from table 42, histogram generator 60 obtains a sample data set from a number of rows of the table column. The number of rows in a table, such table 42, can vary from the hundreds to the billions. In one example, the number of rows in the sample data set is a percentage of the total number of rows in the table column. In one example, the percentage is 5% for a small table and 1% for a large table. In one example, the number of rows in the sample data set has a cap, such as at several million rows.

Histogram generator 60 creates a first CBF instance based on the parameters described above, including using the parameter "n" (i.e. an estimate of the number of unique values in the sample data set) to determine to the number of bins, m, in the array of bins. In one example, the number of bins, m, in the array is determined by the equation $m=(n \ln p)/(\ln 2)^2$; where p is the false positive probably of the CBF instance.

In one example, histogram generator 60 uses an estimate of the number of unique values, n, in the sample data set based on a number of unique values in the table column which is known from previous statistical analyses and is stored in statistics table 54, for instance. In one example, when the number of unique values in the table column is known from previous analyses, the number is scaled down or up in proportion to the size of the sample data set to determine the value of n. In one example, when a previously determined value of the number of unique values in the table column is not known, histogram generator 50 performs a pilot sampling of the sample data set and estimates the number of unique values in the pilot sample using an estimating tool, such as by using a Jackknife-Schlosser estimators and hybrid formulations thereof. The number of unique values from the pilot sample is then scaled up to estimate the number of unique values, n, for the sample data set.

In one embodiment, the pilot sample is a fixed number of rows of the sample data set, such as a range from 1,000 to 2,000 rows of the sample data set (e.g. the first 1,000 rows of the sample data set).

Figure 2:
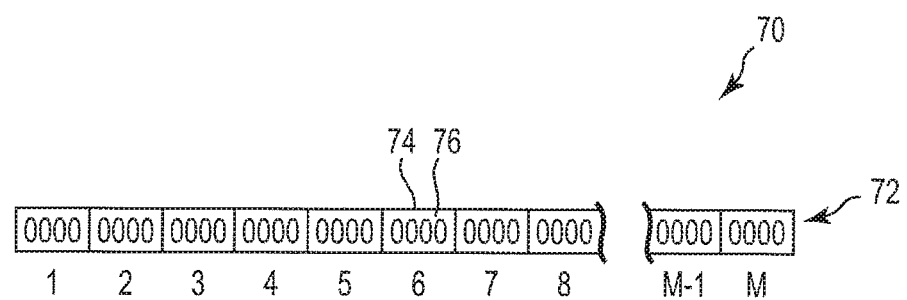
FIG. 2 is a schematic diagram illustrating an example of a counting bloom filter instance.

FIG. 2 illustrates an example of a CBF instance 70 that can be used by histogram generator 60. CBF instance 70 includes an array 72 of bins, such as bin 74, with the bins being sequentially labeled as bins 1 through m, with each bin having a multi-bit counter, such as multi-bit counter 76 of bin 74. Together, the counters of the array of bins 72 form an array of counters, each counter of the array of counters corresponding to a bin. In the illustrated example, each bin has a 4-bit counter indicated as being set at zero. According to one example, the number of bits histogram generator 60 employs for the counter for each bin is selected such that the counter can store at least an average frequency of the unique values as calculated from the estimation performed on the pilot sample. In addition to the bin array 72, and a parameter set, as described above, CBF instance 70 further includes a list data structure 78 and an overflow table 80, each of which be described in greater detail below.

To identify all unique values and their corresponding occurrence frequencies in the sample data set of the table column, histogram generator 60 begins by successively inserting the values of the sample data set into the first CBF instance. Each inserted value becomes the argument to each of the k-hash functions of the first CBF instance, such as CBF instance 70, with each of the k-hash functions mapping the inserted value to one of the m array positions or bins of the bin array 72 and incrementing the corresponding multi-bit counter accordingly.

It is noted that, initially, all of the multi-bit counters, such as multi-bit counter 76 of bin 74, is set to zero. If the counter of at least one bin to which the inserted value is mapped by the k-hash functions is incremented from "zero", the inserted value is determined to be a unique value, v, and is added to a list data structure of unique values associated with the CBF instance. If the counter of all the bins to which the inserted value is mapped by the k-hash functions already have non-zero values when incremented, the value is determined to already have been identified as being a unique value and is not added to the associated list data structure of the CBF instance.

Figure 3:
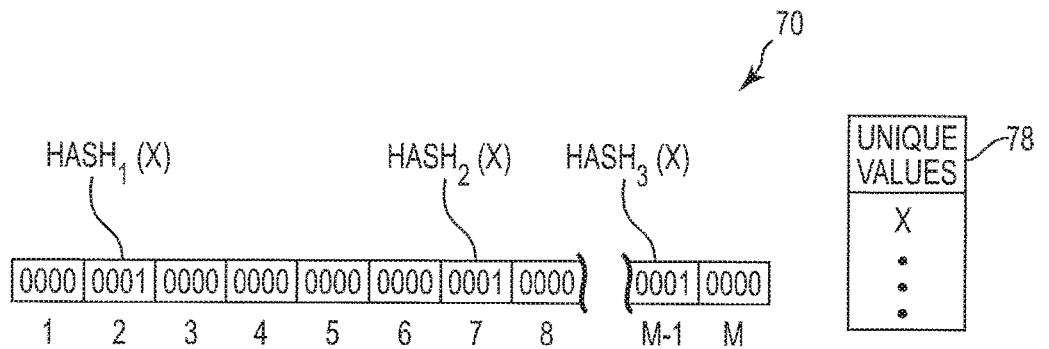
FIG. 3 is a schematic diagram illustrating an example operation of a counting bloom filter instance.
Figure 4:
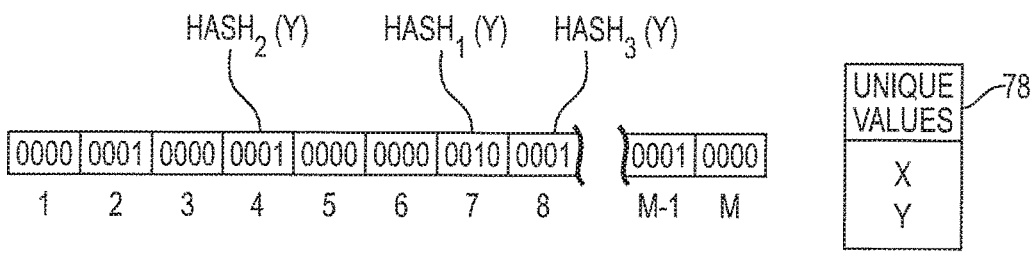
FIG. 4 is a schematic diagram illustrating an example operation of a counting bloom filter instance.
Figure 5:
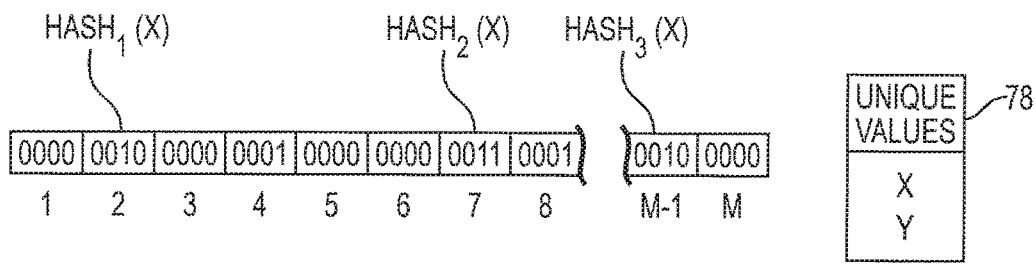
FIG. 5 is a schematic diagram illustrating an example operation of a counting bloom filter instance.

FIGS. 3-5 illustrate an example of this process where CBF instance 70 includes three hash functions (k=3), referred to as $hash_1$, $hash_2$, and $hash_3$, and where all of the counters of the bin array are initially set to zero (as illustrated by FIG. 2). Referring to FIG. 3, initially, a first value, x, becomes the argument to each of the three hash functions. According to the illustrated example, $hash_1(x)$ maps to bin number 2, $hash_2(x)$ maps to bin number 7, and $hash_3(x)$ maps to bin number m−1, with the corresponding counter of each bin being incremented by one. Since the counter of at least one of the bins to which the first value "x" is mapped is incremented from a value of "zero", the inserted value "x" is determined to be a unique value. As such, the unique value "x" is added to a list data structure, as illustrated at 78, with the counters of the bin array indicating the unique value "x" as having a frequency of "1".

At FIG. 4, the next value "y" of the sample data set is inserted into each of the three hash functions of CBF instance 70. According to the illustrated example, $hash_1(y)$ maps to bin number 7, $hash_2(y)$ maps to bin number 4, and $hash_3(y)$ maps to bin 8, with the corresponding counter of each bin being incremented by one. Again, since the counter of at least one of the bins to which the value "y" is mapped is incremented from a value of "zero", the inserted value "y" is deemed to be a unique value. As such, the unique value "y" is added to the list data structure, as illustrated at 78, with the counters of the bin array indicating the unique value "y" as having a frequency of "1".

At FIG. 5, the next value of the sample date set, which is again "x", is inserted into each of the three hash functions of CBF instance 70. As before, with reference to FIG. 3, $hash_1(x)$ maps to bin number 2, $hash_2(x)$ maps to bin number 7, and $hash_3(x)$ maps to bin number m−1, with the corresponding counter of each bin being incremented by one. However, in this case, since the counter of each of the bins to which the value "x" are incremented from non-zero values, the value "x" is determined to have already been identified as being a unique value. As such, the value "x" is not added to the list data structure 78 as a new unique value, but the counters of the bin array now indicate that unique value "x" as having a frequency of "2" which, as will be described in greater detail below, is the minimal value of all counters associated with the hashes of the value "x".

According to one example, this process is repeated for until all values of the sample data set have been inserted into the CBF instance. However, according to one example, in order to avoid over-populating the bin array of a single CBF instance, which increases the probability of the occurrence of false positives (resulting in the number of unique values being underestimated by the CBF), histogram generator 60 uses a series of CBF instances to determine the number of unique values and their corresponding occurrence frequencies in the sample data set of the table column.

For example, according to one embodiment, before a value from the sample data set is inserted into a current CBF instance being employed, such as CBF instance 70, histogram generator 60 determines the number of bins 74 of the bin array 72 having multi-bit counters with non-zero values. If the number of bins having counters with non-zero values is below a selected threshold, say 50%, for example, the current value from the sample data set is inserted into the current CBF instance. If the number of bins having counters with non-zero values is at or above the selected threshold, histogram generator 60 creates a new CBF instance and employs the new CBF instance as the "current" CBF instance, wherein the new current CBF instance has counters for all bins which are set at zero. The bin array 72 of the "old" CBF instance is maintained in its final state and holds the frequency information of the unique values identified from the sample data set as listed in the corresponding list data structure.

By creating and employing a new CBF instance as the current CBF instance when the number of bits set in the bin array of the previous CBF instance have reached a selected threshold, the occurrence of "false positives" (i.e. the incorrect determination that a value has already been identified) is reduced and a more accurate identification of the unique values and their frequencies from the sample data set is achieved.

According to one example, the new CBF instance is created using the same parameters as the previous, or "old", CBF instance. In one example, the parameter "n" (i.e. an estimate of the number of unique value in the sample data set of the table column) is re-estimated prior for the creation of the new CBF instance.

According to one embodiment, whenever more than one CBF instance exists, prior to inserting a next value from the sample data set into the current CBF instance, the value is first inserted into at least the most recent "old" CBF instance. For example, if the current CBF instance is the third CBF instance being employed, before inserting the value into the third CBF instance, the value if first inserted into the second CBF instance (i.e. the most recent "old" CBF instance). If the value has already been identified by the most recent "old" CBF instance, the counters in the bins of the most recent "old" CBF instance to which the value is mapped are incremented (i.e. the frequency is incremented), and the value is not applied to the current CBF instance (as it has already been identified and been added to the list data structure of unique values of the most recent "old" CBF instance). If the value has not already been identified by the most recent "old" CBF instance, the value is inserted into the current CBF instance and processed accordingly.

According to one example, before inserting a value from the sample data set into the current CBF instance, the value is first inserted into and compared to the bin arrays of all old CBF instances. For example, if the current CBF instance is the third CBF instance being employed by histogram generator 60, before inserting the value into the third CBF instance, the value if first inserted into both the first and the second CBF instances.

In one example, the value is inserted into and compared to the bin array of only the most recent "old" CBF instance. For example, if the current CBF instance is the third CBF instance being employed by histogram generator 60, the value is inserted into and compared to the bin array of only the second CBF instance.

According to one example, values from the sample data set are inserted into only the current CBF instance and are not inserted into any old CBF instances.

According to one example, values from the sample data set are inserted into the most recent "old" CBF instance only when there is only one "old" CBF instance. For example, if the current CBF instance is the second CBF instance being employed by histogram generator 60, before inserting the value into the current CBF instance (i.e. the second CBF instance being employed), the value is first inserted into the most recent "old" CBF instance (i.e. the first CBF instance).

However, once more than two CBF instances have been employed, values from the sample data set are inserted only into the current CBF instance and are not inserted into any old CBF instances. For example, if the current CBF instance is the third CBF instance being employed by histogram generator 60, the value from the sample data set is inserted only into the current CBF instance (i.e. the third CBF instance) and is not inserted into any "old" previous CBF instances, including the most recent "old" CBF instance (i.e. the second CBF instance).

According to one example, overflow table 80 is employed to track the frequencies of values when each of the bins of the array of bins 72 to which the value has been mapped ("hashed") have counters which have reached their maximum value. For example, with reference to FIG. 3, if the 4-bit counter of each of the bins "2", "7", and "m−1" were each already set to the maximum value of "1111" when the value "x" was mapped to them by $hash_1(x)$, $hash_2(x)$, and $hash_3(x)$, histogram generator 60 adds the value "x" to overflow table 80 and thereafter tracks the occurrence frequency "f" of value "x" via a corresponding counter (e.g. a 5-bit counter) in overflow table 80. By tracking the occurrence frequencies "f" in overflow table 80 for what is typically a relatively small number of frequently occurring values memory space is saved by not providing all counters of bin array with a bit capacity necessary to count the frequencies of such frequently occurring values, capacity that would likely go unutilized. For example, rather than providing all counters in the bin array with 5-bits, counters of the bin array are provided with only 4-bit counters, and only those values that have frequencies exceeding the capacity of a 4-bit counter are moved to overflow table 80 and tracked with counters having additional bit length.

After all values of the sample data set have been inserted into the series of CBF instances (a series of at least one), all unique values occurring in the sample data set will have been identified and saved to the corresponding list data structures 78 of each of the CBF instances, and the occurrence frequencies of all unique values will have been accumulated by and stored in the counters of the bin arrays and overflow tables of the series of CBF instances. Based on the identified unique values and their occurrence frequencies in the sample data set, histogram generator 60 then determines equal-height histogram statistics for the table column.

In order to do so, histogram generator 60 employs the identified unique values from the list data structures of the CBF instances and extracts the frequency data of the identified unique values from the counters and overflow tables of the corresponding CBF instances. For example, according to one embodiment, for each CBF instance of the series of CBF instances (wherein the series includes at least one CBF instance) histogram generator 60 applies each unique value from the CBF instance's corresponding list data structure to the hash functions to determine the bins of the bin array to which the unique value is mapped. The histogram generator 60 then takes the lowest valued counter of the bins to which the unique value is mapped (including values in any overflow tables) as the frequency of the unique value. For example, referring to FIG. 5, when determining the frequency of unique value "x", histogram generator 60 looks to bin number 2 (having a counter value of 0010), bin number 7 (having a counter value of 0011), and bin number m−1 (having a counter value of 0010). Histogram generator 60 takes the lowest counter value of these bins (in this case, either bin number 2 or bin number m−1) as the frequency of unique value "x", in this example, a frequency of 2.

Histogram generator 60 then employs the identified unique values and their occurrence frequencies to determine histogram statistics for the table column. According to one example, prior to generating the histogram statistics, histogram generator 60 encodes the identified unique values, v, so that each encoded value, encode(v), is a fixed width value, and then pairs the encoded value, encode(v) with the corresponding frequency value, f. In one example, the histogram generator 60 encodes each identified value, v, so that the encoded value, encode(v) is an 8-byte value. In one embodiment, for SQL integer data types, the encoded value is the value itself, while for SQL CHAR, DATE, and timestamp data types, the encoding is a floating point value (e.g. an 8-byte floating point value) which preserves the sort order of the value in the entire domain of the table column. For example, if value "x" is greater than value "y", encode (x) is greater than encode(y). Encoding the identified unique values enables histogram generator 60 to work with the data in a compact form, thereby reducing an amount of required memory.

Histogram generator 60 then works with the encoded values, encode(v), paired with the corresponding frequencies, f, to determine equal-height histogram statistics for the table column. In one example, to generate equal-height histogram statistics, histogram generator 60 first forms an equal-width histogram with all pairs (encode(v), t), and then converts the equal-width histogram to an equal-height histogram.

Figure 6:
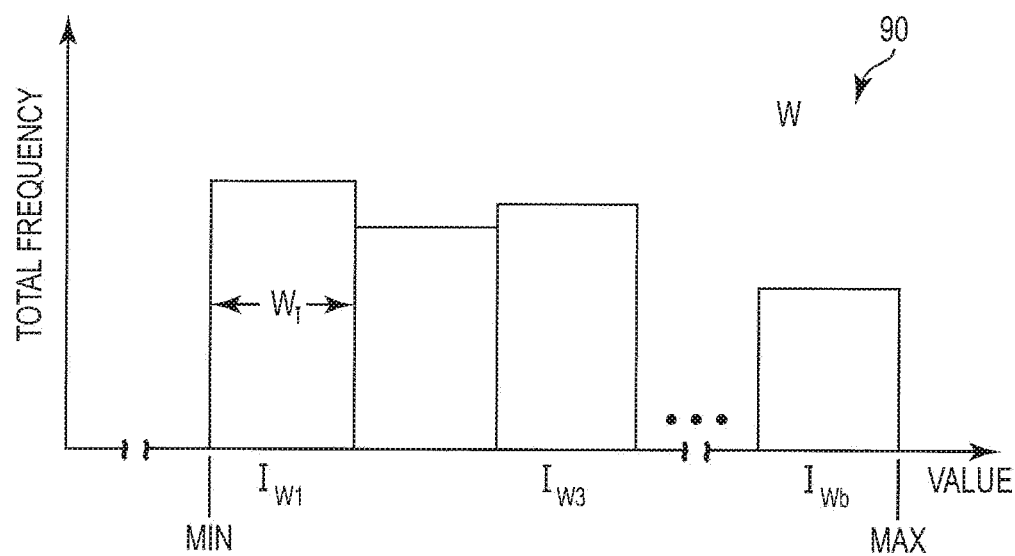
FIG. 6 is a graph illustrating an example of an equal-width histogram.

FIG. 6 is a graph 90 illustrating an example of an equal-height histogram, W. Histogram W has a number of intervals, b, illustrated as intervals $I_{W1}$ to $I_{Wb}$. In one example, the number of intervals, b, is set to the number of intervals of the equal-height histogram constructed from histogram W (as will be described by FIG. 7 below). In one example, the total number of intervals, b, is typically a value from 50 to 100. In graph 90, the x-axis is the magnitude of the unique values, in this example, the encoded values, encode(v), and the y-axis is the frequency of the unique values, in this example, the total frequency of each interval.

In one example, a width of each interval, $W_I$, is a constant found from the equation $W_I=(max-min)/b$; where "max" is the encoded value of the largest identified unique value, "mid" is the encoded value of the smallest identified unique value, and "b" is the number of intervals in W. The smallest identified unique value, min, is the lower end or lower boundary of the first interval $I_{w1}$, and the largest identified unique value, max, is the upper end or upper boundary of the last interval $I_{Wb}$.

In one example, to populate histogram W, the encoded values, encode(v), and corresponding frequencies, f, are inserted into one of the intervals $I_W$ based on equation Interval#=(encode(v)−min)/$W_I$; where, as described above, $W_I$ is the width of each interval. After all of the unique values, encode(v) are inserted into histogram W, for any two intervals of histogram W, say interval $I_x$ and interval $I_y$, where x<y, any encoded value in interval $I_x$ is less than any encoded value in interval $I_y$. The combined or total frequency is determined for all encoded values in each interval and represents the height of each interval, as illustrated along the y-axis. Histogram generator 60 then constructs an equal-height histogram from the equal-width histogram W.

Figure 7:
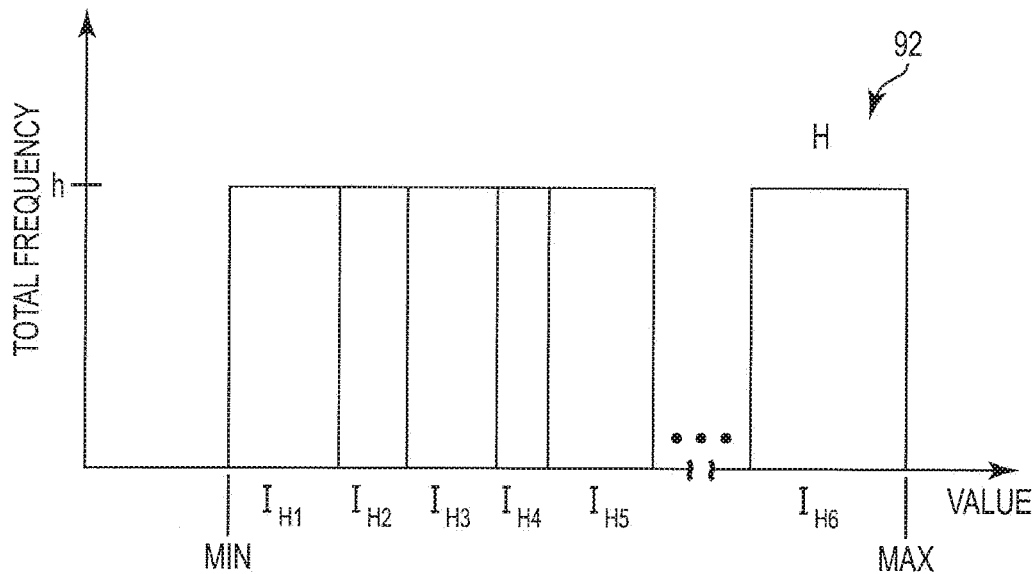
FIG. 7 is a graph illustrating an example of an equal-height histogram.

FIG. 7 is a graph 92 illustrating an example of an equal-height histogram, H. Histogram H has a number of intervals, b, illustrated as intervals $I_{H1}$ to $I_{Hb}$. As described above, the number of intervals, b, is a constant and is typically a value in a range from 50 to 100. In graph 92, the x-axis is the magnitude of the unique values, in this example, the encoded values, encode(v), and the y-axis is the frequency of the unique values, in this example, the combined or total frequency of each interval. Each interval has a height, h, which is set to a desired number of rows for each interval (a desired total frequency of the encode(v) values for each interval).

From equal-width histogram, W, the total frequency of each interval $I_W$ is known. According to one example, beginning with the first interval, $I_{W1}$, of equal-height histogram, W, histogram generator 60 sequentially transfers the encode(v) values of each interval $I_W$ into equal-height histogram H to sequentially fill the intervals $I_{H1}$ to $I_{Hb}$ to the desired height, h, also optionally sorting the encode(v) values within each interval $I_W$ sequentially from smallest to largest (e.g. no sorting is necessary when all values in $I_W$ can be moved to $I_H$).

As an example of how histogram generator 60 populates histogram H from histogram W, let a current interval of histogram H being filled from histogram W be denoted as $I_H$, and a number of remaining occurrences of encode(v) values to fill $I_H$ to the desired height, h, be denoted as $n_H$. For an interval $I_W$ in equal-width histogram, W, if the total frequency F of interval $I_W$ is less than $n_H$, histogram generator 60 moves all values from $I_W$ to $I_H$, subtracts F from $n_H$, and proceeds to the next interval in histogram W.

If the total frequency F of interval IW is greater than $n_H$, the encoded values within interval $I_W$ are split, with a portion of the encoded values within interval $I_W$ used to complete the filling of interval $I_H$ and the remaining portion being used to fill subsequent interval(s) of histogram H. To complete filling interval $I_H$, a histogram generator 60 performs a sort of all encode(v) values in interval $I_W$ and moves all occurrences of the k smallest encode(v) values to interval $I_H$, where the sum of all occurrences of the k smallest encode(v) values (i.e. the total frequency of the k smallest encode(v) values) is at least equal to $n_H$, and where the sum of all occurrences of the k−1 smallest encode(v) values is less than $n_H$. The upper end of the range of values for interval $I_H$ (an upper boundary value for interval $I_H$) is the largest encode(v) value of the k smallest encode(v) values, with the value of the k+1 encoded(v) value in interval $I_W$ being the lower boundary value for next interval. $I_{H+1}$, of equal-height histogram H.

Histogram generator 60 carries out the above described process until any remaining values of the encode(v) values of the last interval, $I_{Wb}$, of equal-width histogram W have been inserted into the last interval, $I_{Hb}$, of equal-height histogram H. According to one example, after populating equal-height histogram H, histogram generator 60 estimates, for each interval $I_H$, the number of unique values, the row count (the total frequency), and other parameters and scales them up for the entire table column.

Figure 8:
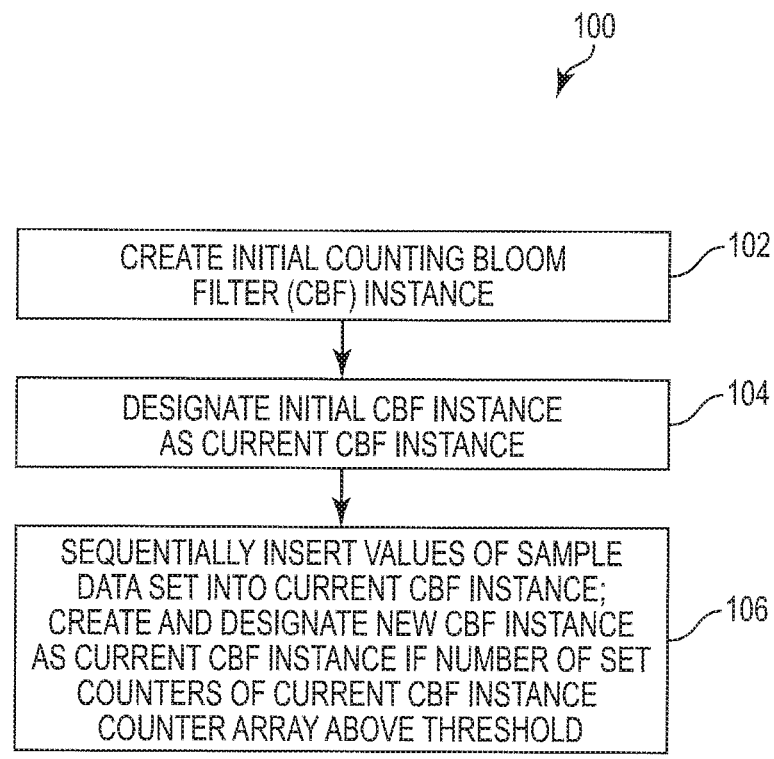
FIG. 8 is a flow diagram illustrating an example of a method for managing a database.

FIG. 8 is a flow diagram illustrating an example of a method 100 for managing a database according to the present disclosure. Method 100 begins at 102 where an initial CBF instance is created, the initial CBF instance having an array of counters, and hash functions which map an inserted value to the array of counters. At 104, the initial CBF instance is designated as a current CBF instance.

At 106, method 100 sequentially inserts each value of a sample data set of a table column (a column of data from a table in the database) into the hash functions of the current CBF instance, and increments the counters of the array of counters to which the value is mapped by the hash functions. However, prior to inserting each value of the sample data set, if a number of counters in the array of counters having non-zero values is at least a threshold level (e.g. 50% of the counter in the array), method 100 includes designating the current CBF instance as an old CBF instance, creating a new CBF instance having an array of counters and hash functions that map an inserted value to the array of counters, and designating the new CBF instance as the current CBF instance.

Figure 9:
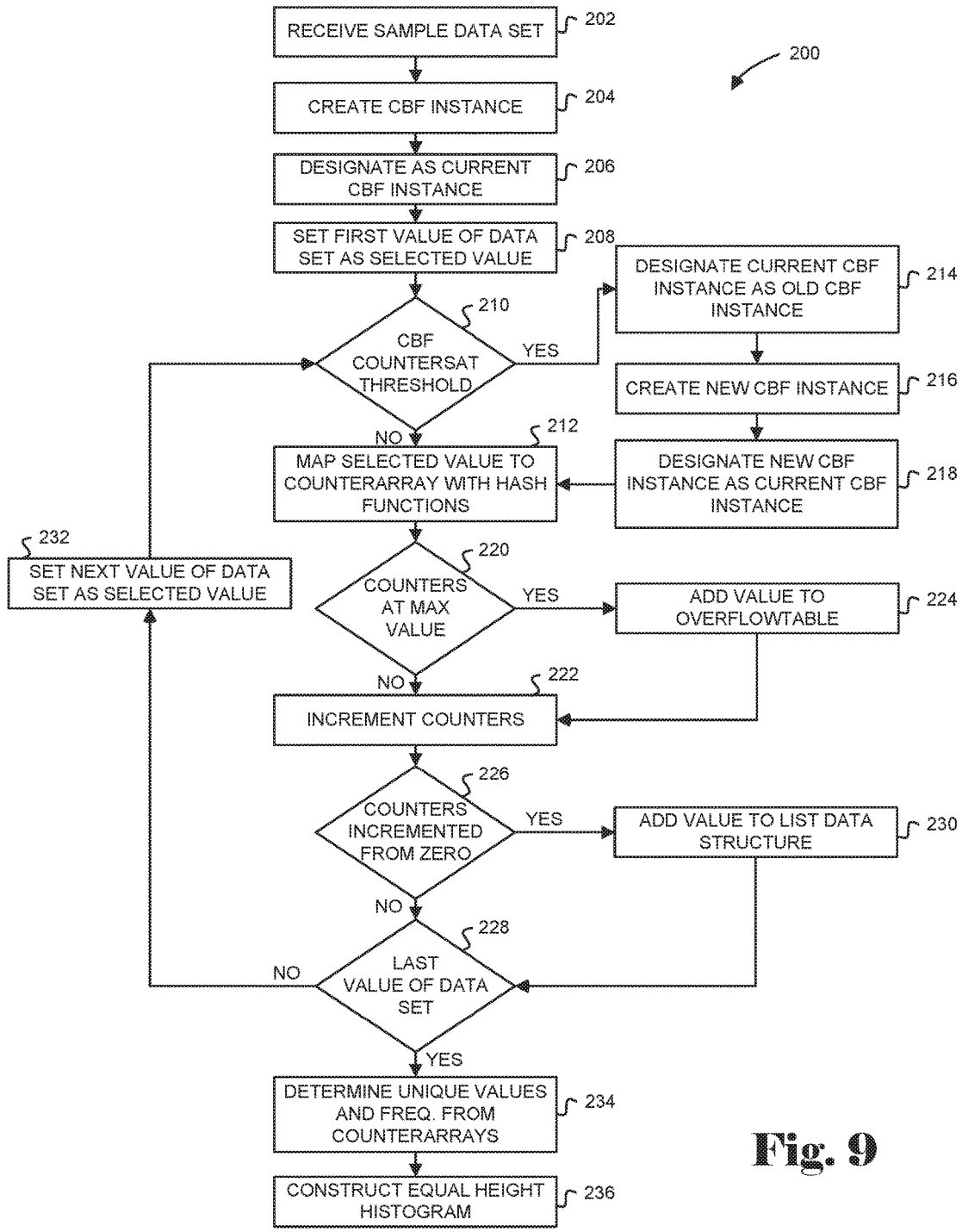
FIG. 9 is a flow diagram illustrating an example of a method for managing a database.

FIG. 9 is a flow diagram illustrating an example of a method 200 for managing a database in accordance with the present disclosure. Method 200 begins at 202 with obtaining a sample data set from a table column of a database. At 204, an initial CBF instance is created, such as CBF instance 70 illustrated by FIG. 2, which includes an array of counters, a set of hash functions which map an inserted value to the array of counter, a list data structure, and an overflow table. The initial CBF instance is created based on a plurality of parameters, such as a number of unique values in the sample data set, a number of hash functions, a false positive probability, and an average frequency of occurrences of a value before it is moved to the overflow table.

According to one example, a number of counters in the array of counters is based on an estimated number of unique values in the table column of data. In one example, the estimated number of unique values in the table column is known and stored from previous estimates for the table column. In one example, the estimated number of unique values in the table column in not known and is determined by taking a pilot sample of the sample data set and estimating the number of unique values in the table column by applying an estimation tool, such as a Jackknife family-Schlosser or a hybrid combination estimator, for example.

At 206, the initial CBF instance is designated as a current CBF instance. At 208, method 200 begins a process of sequentially inserting each value of the sample into the current CBF instance, beginning by setting a first value of the sample data set as a selected value.

At 210, method 200 queries whether a number of counters in the array of counters of the current CBF instance having non-zero values is above a threshold level (such as 50%, for example)? If the answer to the query at 210 is "NO", method 200 proceeds to 212. If the answer to the query at 210 is "YES", method 200 proceeds to 214, where the current CBF instance is designated as an "old" CBF instance. At 216, a new CBF instance is created based on the plurality of parameters as described above, but can have a number of counters in the array of counters and different hash functions, for example, than the initial CBF instance (i.e. each CBF instance can be unique). At 218, the new CBF instance is designated as the current CBF instance, and method 200 proceeds to 212.

At 212, method 200 inserts the selected value from the sample data set in into the current CBF instance, and the selected value is mapped to the corresponding array of counters by the hash functions. At 220, method 200 queries whether each of the counters of the array of counters to which the selected value is mapped are at a maximum value. For example, a 4-bit binary counter having a value of "1111" (i.e. a value of "15"), would be at a maximum value. If the answer to the query at 220 is "NO", method 200 proceeds to 222.

If the answer to the query at 220 is "YES", method 200 proceeds to 224, where the selected value is moved to an overflow table, such as overflow table 80 (see FIG. 2) and thereafter has its occurrence tracked via a corresponding counter in the overflow table. Method 200 then proceeds to 222.

At 222, the counters to which the selected value are incremented, including any counters that have been moved to the overflow table. Method 200 then proceeds to 226, where it is queried as to whether any of the counters to which the selected values have been mapped were incremented from a value of "zero". If the answer to the query at 226 is "NO", method 200 proceeds to 228. If the answer to the query at 226 is "YES", method 200 proceeds to 230 where the selected value is deemed to be a unique value, and is added to the list data structure of unique values corresponding to the current CBF instance (see FIGS. 2-5, for example). Method 200 then proceeds to 228.

In one example, which is not illustrated in FIG. 9, prior to proceeding to 212 from both the "NO" query at 210 and the designation of a new CBF instance as a current CBF instance at 218, method 200 first queries whether there any old CBF instances. If the answer is "NO", method 200 proceeds to 212. If the answer is "YES", method 200 then inserts the selected value into the hash functions of each of the old CBF instances to determine whether the selected value has already been identified as being a unique value by any of the old CBF instances. If the selected value has not previously been identified by any of the old CBF instances, method 200 proceeds to 212. If the selected value has already been identified by an old CBF instance, the counters to which the selected value is mapped in the old CBF instance which previously identified the selected value are incremented and method 200 proceeds to 228.

At 228, method 200 queries whether the selected value of the sample data set is the last value of the sample data set. If the answer to the query at 228 is "NO", method 200 proceeds to 232, where the next value of the sample data set is set at the selected value, and then returns to the query at 210.

If the answer to the query at 228 is "YES", method 200 has completed processing the entire sample data set through the series of CBF filter instances (a series of at least one CBF instance), and proceeds to 234. At 234, method 200 determines all unique values and their occurrence frequencies based on the unique values listed in the list data structures and from the counts stored in the array of counters of the current and old CBF instances.

At 236, based on the complete list of unique values and occurrence frequencies thereof, method 200 constructs and equal-height histogram for the table column. According to one example, as illustrated and described above by FIGS. 6 and 7, method 200 first pre-sorts the identified values into an equal-width histogram during a first pass through the list of unique values and frequencies, and then converts the equal-width histogram to an equal-height histogram. In one example, method 200 estimates the number of unique values of entries (the unique entry count (UEC)), the row count, and other parameters for each interval in the equal-height histogram (intervals $I_H$ in FIG. 7), and scales up to estimate the parameters for the entire table column.

By using a series of CBF instances to identify unique values and occurrences in a sample data set of a table column, and by pre-sorting the identified unique values and frequencies into an equal-width histogram, and then converting the equal-width histogram to an equal-height histogram, according to examples of method of the present disclosure, the time and memory space required to provide equal-height histogram statistics for a database are improved relative to present techniques.

FIG. 10 illustrates tables "A" and "B" compares the performance of methods according to the present disclosure relative to present techniques, such as the "Direct Sample" method and the "Sample Table" method, which were described earlier with respect to FIG. 1. Table "A" illustrates performance in terms of "elapsed time", and Table "B" illustrates performance in terms of memory usage as measured in bytes. In both tables, the performance is with regard to sets of 7 and 10 columns from a database table (such as table 42 of FIG. 1) having 13 columns and containing over 40 million rows of data. From Tables "A" and "B", it can be seen that a method using a series of CBF instances to identify unique values and occurrences and constructing equal-height histograms from unique values and occurrence histories pre-sorted into an equal-width histogram, according to the present application, is at least as fast as the "Direct Sample" and "Sample Table" techniques, and uses less memory than the "Direct Sample" technique.

Figure 11:
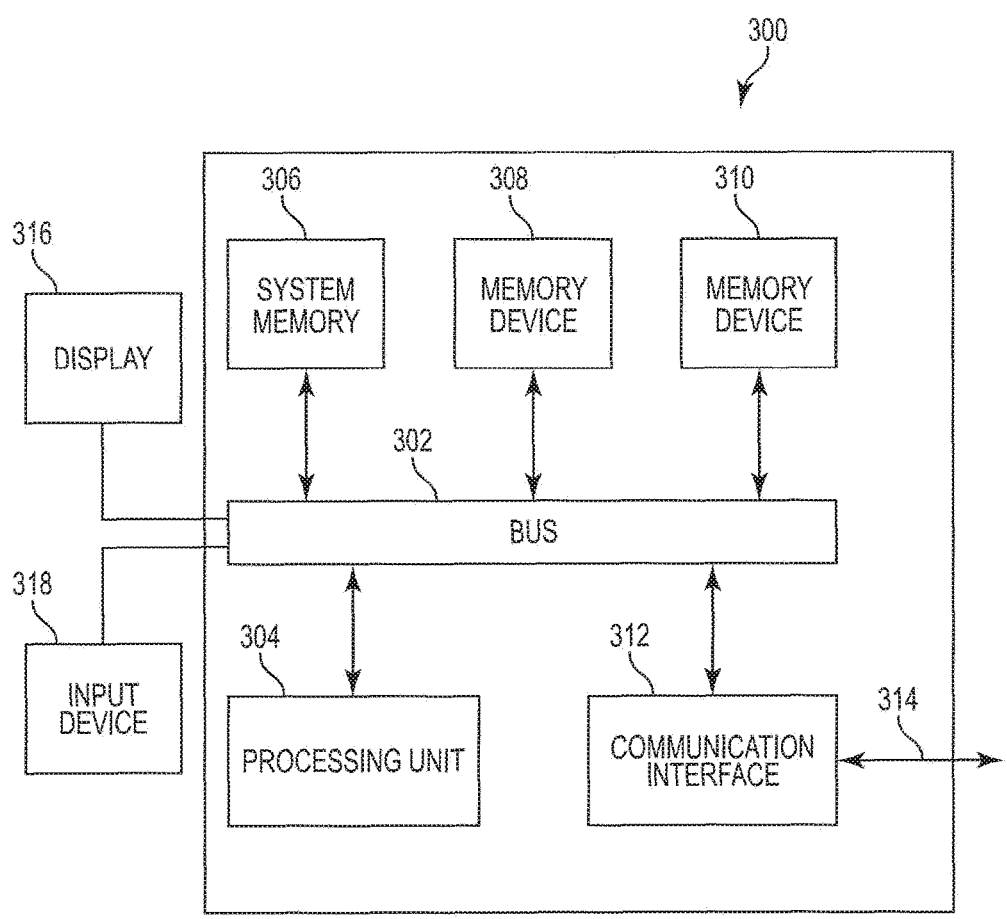
FIG. 11 a schematic block diagram illustrating an example of a computer system.

FIG. 11 is schematic block diagram illustrating an example of system 300 in which embodiments of the present disclosure can be implement, such as those described and illustrated above by FIGS. 1-10, including system 30, DBMS 36, and optimizer 50 having histogram generator 60 with CBF instances 62. System 300 can include various systems and subsystems, and can be a personal computer, a laptop computer, a workstation, a computer system, and application specific integrated circuit (ASIC), a server, a server blade center, and a server farm, among others, for example.

System 300 includes a system bus 302, a processing unit 304, a system memory 306, memory devices 308 and 310, a communications interface 312 (e.g. a network interface), a communication link 314, a display 316 (e.g. a video screen), and an input device 318 (e.g. a keyboard, mouse). System bus 302 can be in communication with processing unit 304 and system memory 306. Additional memory device 308 and 310, such as a hard disk drive, server, stand-alone database, or other non-volatile memory, can also be in communication with system bus 302. System bus 302 interconnects processing unit 304, memory devices 306, 308, 310, communication interface 312, display 316, input device 318, and additional ports, such as a universal serial bus (USB) port, for example.

Processing unit 304 can be a computing device and can include an ASIC. Processing unit 304 can execute instructions for performing operations, such as database management operation in accordance with examples of histogram generator 60 as described by the present application. Processing unit 304 can include a processing core.

Additional memory device 306, 308, and 310 can store data, programs, instructions, and any other information necessary to operate a computer. Memories 306, 308, and 310 can be implemented as a computer-readable media (integrated and/or removable), such a memory card, disk drive, compact disk, or server accessible over a network. Memory devices 306, 308, and 310 can serve as databases or data storage, such as data storage 38 of FIG. 1.

Histogram generator 60 can be implemented as hardware, firmware, software, or any combination thereof. For example, all of part of histogram generator 60 can be implemented as a computer storage medium storing computer executable instructions to perform a method. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of system 300 and employed as memory devices 306, 308, and 310.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of managing a database comprising:
creating an initial counting bloom filter (CBF) instance having an array of counters and hash functions that map an inserted value to the array of counters;
designating the initial CBF instance as a current CBF instance;
sequentially inserting each value of a sample data set of a table column into the hash functions of the current CBF instance and incrementing counters of the array of counters to which the value is mapped, wherein prior to inserting each value, when a number of counters of the array of counters having non-zero values is at least at a threshold level:
designating the current CBF instance as an old CBF instance;
creating a new CBF instance having an array of counters and hash functions that map an inserted value to the array counters; and
designating the new CBF instance as the current CBF instance.

2. The method of claim 1, wherein prior to inserting each value, when the number of counters of the array of counters having non-zero values is below the threshold level, continue employing the current CBF instance without designating the current CBF instance as an old instance, without creating a new CBF instance, and without designating the new CBF instance as the current CBF instance.

3. The method of claim 1, further including:
identifying unique values and corresponding frequencies in the column table based on counter values of the counter arrays of the current and old CBF instances.

4. The method of claim 3, further including:
deeming a value of the sample data set to be a unique value when at least one of the counters to which the value is mapped by the hash functions is incremented from zero; and
placing the unique value in a list data structure corresponding to the current CBF instance.

5. The method of claim 4, wherein after all values of the sample data set have been inserted into a CBF instance, the method further including:
for each list data structure, sequentially inserting each unique value into the hash functions of the corresponding CBF instance and taking the lowest value of the counters to which the unique value is mapped as the frequency of the unique value;
identifying all unique values and corresponding frequencies in the sample data set; and
extrapolating from the unique values and corresponding frequencies in the sample data set to determine frequencies of the unique values in the table column using an estimation tool.

6. The method of claim 3, further including constructing an equal-height histogram for the table column from the identified unique values and corresponding frequencies.

7. The method of claim 6, including:
constructing an equal-width histogram by sorting the identified unique values into a number of intervals, each interval having a value range of a same magnitude, such that when the intervals are taken in ascending order, any unique value in a given interval is greater than any unique value in an immediately preceding interval; and
converting the equal-width histogram to the equal-height histogram, the equal-height histogram having the same number of intervals as the equal-width histogram, by successively redistributing the unique values from the intervals of the equal-width histogram into intervals of the equal-height histogram such that all occurrences of a given unique value are included in a same interval and such that a total number of unique values in each interval of the equal-height histogram, except for the final interval, is at least equal to a desired number.

8. The method of claim 7, prior to sorting the unique values to the equal-width histogram, encoding the unique values so that each unique value has a same length.

9. The method of claim 1, wherein when each counter of an array of counters to which a value is mapped is at a maximum value, the method including:
inserting the value in an overflow table of the CBF instance; and
incrementing a corresponding counter in the overflow table to track the occurrence frequency of the value thereafter.

10. The method of claim 1, wherein the number of counters in each array of counters of each CBF instance is based on an estimated number of unique values in the sample data set, and wherein the method includes:
taking a pilot sample of the sample data set;
applying an estimating tool to the pilot sample to estimate the number of unique values in the table column from the pilot sample.

11. A non-transitory computer readable storage medium having a set of machine readable instructions that, when executed, cause a database management system to:
receive a list of unique values and corresponding occurrence frequencies present in a sample data set of a table column of the database;
construct an equal-width histogram by sorting the identified unique values into a number of intervals, each interval having a value range of a same magnitude, such that when the intervals are taken in ascending order, any unique value in a given interval is greater than any unique value in an immediately preceding interval; and
convert the equal-width histogram to the equal-height histogram, the equal-height histogram having the same number of intervals as the equal-width histogram, by successively sorting the unique values from the intervals of the equal-width histogram into intervals of the equal-height histogram such that all occurrences of a given unique value are included in a same interval and such that a total number of unique values in each interval of the equal-height histogram, except for the final interval, is at least equal to a desired number.

12. The non-transitory computer readable storage medium of claim 11, the set of machine readable instructions further causing the database management system to encode the unique values in the list into fixed width values prior to constructing the equal-width histogram, wherein a lower end of the value range for the first interval of the equal-width histogram is that of the minimum unique value, and the upper end of the value range of the last interval of the equal-width histogram is that of the maximum unique value.

13. A database management system comprising:
a memory device to store computer executable instructions; and a processing unit to access the memory device and execute the computer executable instructions, the computer executable instructions providing instructions to:

create an initial counting bloom filter (CBF) instance having an array of counters and hash functions that map an inserted value to the array of counters;

designate the initial CBF instance as a current CBF instance;

sequentially insert each value of a sample data set of a table column into the hash functions of the current CBF instance and incrementing counters of the array of counters to which the value is mapped, wherein prior to inserting each value, when a number of counters of the array of counters having non-zero values is at least at a threshold level:

designate the current CBF instance as an old CBF instance;

create a new CBF instance having an array of counters and hash functions that map an inserted value to the array counters; and designate the new CBF instance as the current CBF instance.

14. The database management system of claim 13, the computer executable instructions providing instructions to: wherein prior to inserting each value into the hash functions of the current CBF instance, when there is more than one old CBF instance to insert the value into the current CBF, and when there is only one old CBF instance:

to insert the value into the hash functions of the old CBF instance to determine if the value has already been identified as being unique by the old CBF instance, and if so, incrementing counters of the array of counters of the old CBF instance to which the value is mapped by the hash functions and not inserting the value into the current CBF instance, and when not already identified as being unique by the old CBF instance to insert the value into the current CBF instance.

15. The database management system of claim 13, wherein the computer executable instruction further provide instructions to:

construct an equal-width histogram by sorting the identified unique values into a number of intervals, each interval having a value range of a same magnitude, such that when the intervals are taken in ascending order, any unique value in a given interval is greater than any unique value in any preceding interval; and convert the equal-width histogram to the equal-height histogram, the equal-height histogram having the same number of intervals as the equal-width histogram, by successively sorting the unique values from the intervals of the equal-width histogram into intervals of the equal-height histogram such that all occurrences of a given unique value are included in a same interval and such that a total number of unique values in each interval of the equal-height histogram, except for the final interval, is at least equal to a desired number.

\* \* \* \* \*